(12) United States Patent
Ruffa

(10) Patent No.: US 8,488,414 B1
(45) Date of Patent: Jul. 16, 2013

(54) ACOUSTIC LINE SOURCE

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 537 days.

(21) Appl. No.: 12/884,348

(22) Filed: Sep. 17, 2010

(51) Int. Cl.
*H04B 1/03* (2006.01)

(52) U.S. Cl.
USPC .......................................................... 367/143

(58) Field of Classification Search
USPC .................................. 367/143, 142, 141, 137
See application file for complete search history.

(56) References Cited

U.S. PATENT DOCUMENTS

| | | | | |
|---|---|---|---|---|
| 3,376,949 A | * | 4/1968 | Baker et al. .................... | 181/120 |
| 4,396,088 A | * | 8/1983 | Bayhi ............................ | 181/120 |
| 5,150,335 A | * | 9/1992 | Hoffman ........................ | 367/101 |
| 5,459,699 A | * | 10/1995 | Walter ............................ | 367/142 |
| 5,519,670 A | * | 5/1996 | Walter ............................ | 367/142 |
| 7,106,656 B2 | * | 9/2006 | Lerro et al. ...................... | 367/99 |

* cited by examiner

*Primary Examiner* — Daniel Pihulic
(74) *Attorney, Agent, or Firm* — James M. Kasischke; Jean-Paul A. Nasser; Michael P. Stanley

(57) ABSTRACT

An active sonar system for detecting objects in water includes: a transmitter capable of generating and transmitting an acoustic signal having acoustic pressure pulses; a cable extending from the transmitter into the water, the cable including a hose filled with hydraulic fluid receiving the acoustic pressure pulses from the transmitter, a water blocking layer and cable wire; and a winch assembly including a winch drum for deploying and retrieving the cable into and out of water. A flattened hydraulic chamber section of the hose is secured within the winch drum with acoustic transducers mounted on either side of the flattened chamber section, so that the acoustic transducers act as pistons to generate acoustic pressure onto the hydraulic fluid for generation along a length of the cable.

9 Claims, 4 Drawing Sheets

ACOUSTIC LINE SOURCE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention is directed generally towards a system for transmitting acoustic fields underwater and more specifically towards a system for transmitting acoustic fields underwater from a cable towed by a ship or airborne device.

(2) Description of the Prior Art

A ship such as a military ship can tow an array of sound receiving hydrophones arranged in a passive towed array. The passive towed array, in conjunction with sound receiving and signal processing electronics, can detect sounds in the water that may indicate, for example, the presence of an enemy submarine.

In other arrangements, the ship can tow both the passive towed array of sound receiving hydrophones and also a towed acoustic projector, which together form a bi-static active sonar system. With this arrangement, the towed acoustic projector emits sound pulses. Each sound pulse travels through the water, striking objects or targets in the water, which in turn produces echoes. The echoes are received by the towed array of receiving hydrophones. Therefore, an echo indicates the presence of an underwater object, and the direction from which the echo came indicates the direction of the underwater object.

In conventional bi-static active sonar systems, the towed acoustic projector is often deployed and towed separately from the towed array of sound receiving hydrophones. A conventional towed acoustic projector typically includes a sound source mounted within a large rigid tow body. The conventional towed acoustic projector is large and heavy. For example, the size can be on the order of forty-eight cubic feet and the weight can be on the order of 4000 pounds. The towed acoustic projector of this type is typically used to detect objects in deep water and at long ranges. Therefore, the towed acoustic projector is capable of generating sound having a high pressure level, (i.e., 220 decibels relative to one micro-Pascal at a distance of one meter) in order to enable the system to receive echoes from and to detect objects in the deep water at long ranges.

The towed acoustic projector is deployed and recovered over the gunwale of the ship with winch and boom equipment. The large towed acoustic projector, which requires deployment over the gunwale of the ship, limits covert deployment and recovery. The deployment and recovery of the towed acoustic projector over the gunwale of the ship may also be unwieldy and dangerous during deployment and recovery in high seas.

Conventional bi-static active toward array systems are configured such that the acoustic projector is handled with equipment separate from equipment that handles the towed array of receiving hydrophones. Large handling equipment is needed to deploy and recover the towed acoustic projector. The large handling equipment requires a considerable amount of deck space on a ship. The large handling equipment is undesirable not only because of the deck space that it requires, but also because it presents a radar target having a larger radar cross section to enemy radar systems.

U.S. Pat. No. 6,683,819 discloses a sonar array system including a receiving array of hydrophones and a transmit array of acoustic projectors disposed on a common axis via a cable. The cable is extended and retrieved by use of a winch. The transmit array has one or more acoustic projectors capable of generating sound and the receive array has one or more hydrophones capable of receiving sound. The one or more acoustic projectors are disposed on a transmit array axis, and the one or more hydrophones are disposed on a receive array axis. The receive array axis and the transmit array axis have a common axis, therefore forming the contiguous line arrays, one for receiving and one for transmitting. The sonar array can be towed to form a horizontal line array having both acoustic projectors and hydrophones. The acoustic projectors and hydrophones can be deployed and recovered using a single winch.

The U.S. Navy used variable depth sonar (VDS) systems towed behind ships in the 1990s. These VDS systems are large, heavy, complex systems that required a large handling system with a dedicated room and a stern door. The heavy tow body led to a steep critical angle for the tow cable, requiring fairing and a specialized winch with multiple drums. The winch and foundation rating was required to exceed a typical cable breaking strength of 100,000 pound.

SUMMARY OF THE INVENTION

Accordingly it is an object of the present invention to provide a sonar system capable of operation from an unmanned surface vehicle to transmit acoustic fields underwater.

An active sonar system for detecting objects in water includes: a transmitter capable of generating and transmitting an acoustic signal having acoustic pressure pulses; a cable extending from the transmitter into the water, the cable including a hose filled with hydraulic fluid receiving the acoustic pressure pulses from the transmitter, a water blocking layer and cable wire; and a winch assembly including a winch drum for deploying and retrieving the cable into and out of water. A flattened hydraulic chamber section of the hose is secured within the winch drum with acoustic transducers mounted on either side of the flattened chamber section, so that the acoustic transducers act as pistons to generate acoustic pressure onto the hydraulic fluid for generation along a length of the cable.

Other objects and advantages of the present invention will become apparent from the following description, drawings and claims.

BRIEF DESCRIPTION OF THE DRAWINGS

The following drawings are not drawn to scale.

DETAILED DESCRIPTION OF THE INVENTION

The acoustic line source transmits acoustic pressure from transducers and amplifiers located on the ship through a steel armored tow cable. Hydraulic fluid in a flexible hydraulic hose integrated into the cable allows it to radiate an acoustic field along its length into the underwater environment.

Off-the-shelf flexible hydraulic hoses having a ¼" inner diameter and a ½" outer diameter (rated to 2000 psi pressure) can be integrated into the center of a steel-armored 1" diameter tow cable. Kevlar-reinforced hoses of a similar size are already integrated into such tow cables for high pressure air for use in underwater air guns.

Figure 1:
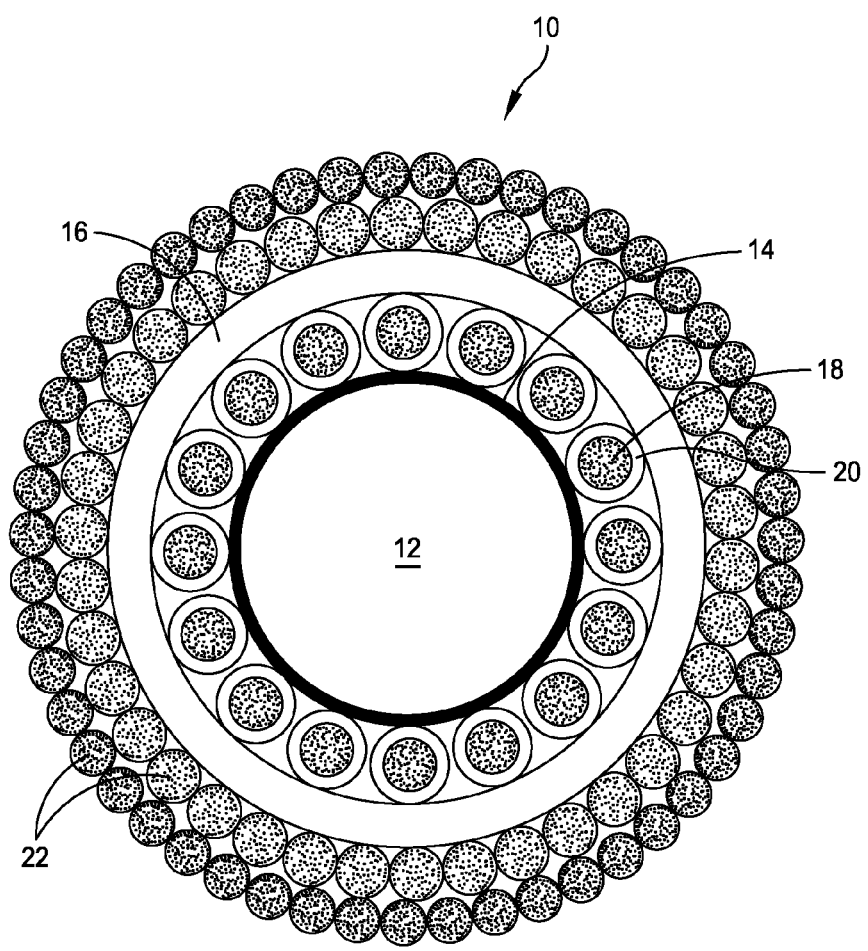
FIG. 1 is a cross-sectional cutout view of a cable constructed to include a hydraulic hose according to the principles of the present invention.

FIG. 1 depicts a cable 10 constructed with a hydraulic hose 14 filled with hydraulic fluid 12, surrounded by electrical conductors 18 protected within insulator layers 20, a water block layer 16, and steel armor wires 22. The wires 22 preferably all have the same diameter, although shown in the figure for a specific embodiment with varying diameters. The electrical conductors 18 support hydrophones or other instrumentation package. However, a dedicated transmit cable could eliminate the electrical conductors to allow a larger diameter hydraulic hose.

Figure 2:
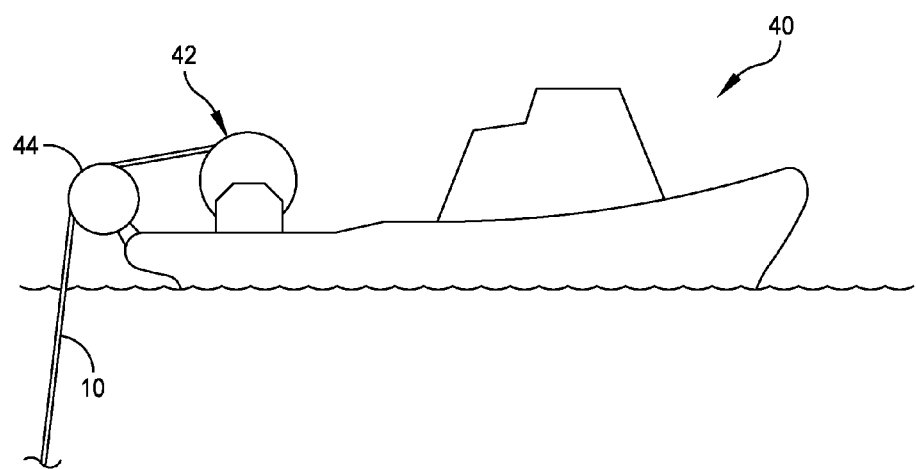
FIG. 2 is an illustration of a small unmanned surface vehicle employing a winch system for deploying and retrieving a cable into the water.
Figure 3:
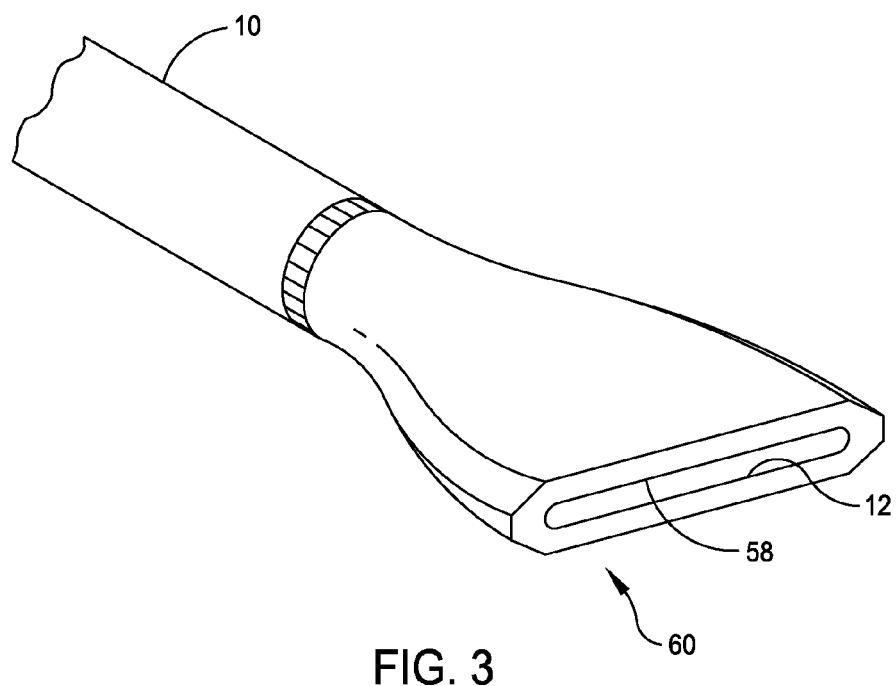
FIG. 3 is a perspective view of a flattened hydraulic chamber used within a winch system in accordance with the principles of the invention.
Figure 4:
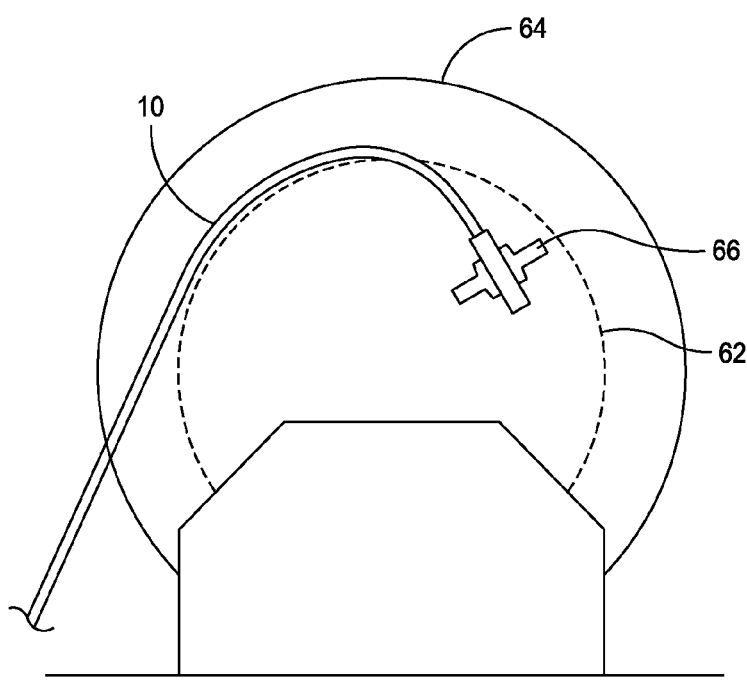
FIG. 4 is a cross-sectional cutout view of selected parts of a winch system for deploying and retrieving a cable into the water.

FIG. 2 shows a stationary 11-meter boat 40 with a winch 42 and roller 44 deploying a cable 10 that assumes a vertical geometry. A flattened section 60 of the hydraulic hose 14 within cable 10 containing a flattened chamber 58 of hydraulic fluid 12 is mounted inside the winch drum 62 having a flange 64 (see FIGS. 3 and 4). The flattened chamber 58 connects to the hydraulic line in the cable 10 to allow the transmission of acoustic pressure generated in the winch drum 62 by acoustic transducers 66, e.g. tonpilz transducers that act as pistons. Locating the entire assembly inside the winch drum avoids a dynamic seal, which would be necessary to extend the hydraulic line outside the winch. A penetration hole in the winch drum allows the cable to transition from inside the drum, a common practice occurring in many handling systems.

The acoustic transducers 66 on the outside of the flattened chamber 60 generate an acoustic field in the hydraulic fluid 12. The flattened chamber 58 has an inner cross sectional area approximately equal to that of the cable/hose cross section, so that no increase in the particle velocity will occur. A greater cross sectional area (relative to that of the cable hose) would be undesirable, because the particle velocity would increase as the area decreases, due to conservation of mass. The increased particle velocity would then lead to increased frictional losses.

In a preferred embodiment, tonpilz transducers 66 acting as pistons generate acoustic pressure in the hydraulic fluid 12 in the flattened cross section. The hydraulic fluid then transmits the acoustic pressure into and along the entire tow cable 10. A tonpilz transducer 66 with a 3" diameter can generate 200 dB of source level. This represents approximately 700 Watts of acoustic power. Because of conservation of energy, the cable 10 would radiate the same amount of acoustic power (minus any losses) along its length.

If the wetted cross section of the flattened section 60 had dimensions of 3" by 3" by 0.0164" (0.415 mm), it would have the same cross sectional area as the hydraulic hose, leading to no increase in the acoustic particle velocity. The amplitude of piston vibration would be only 0.1 micron, or more than four hundred times less than the smallest dimension of the hollow section.

In a preferred embodiment, four tonpilz transducers 66 (two on each side) in contact with the flattened chamber 58 would increase the source level to 206 dB. In addition, the cable length itself leads to a vertical directionality that concentrates the power in the main beam transmitted into the ocean. A 150 meter long vertical tow cable 10 at a frequency of 3 kHz would have a directivity index (DI) of 28 dB, according to equation (1):

$$DI = 10 \log \frac{2L}{\lambda}. \quad (1)$$

Equation (1) assumes a cable transmitting at broadside. This cable will approximate that condition for a CW (continuous wave) transmission when it establishes a standing wave. A pulsed waveform, on the other hand, will more closely approximate an end fire beam pattern.

The wavelength $\lambda = c/f$, where the speed of the sound $c = 1500$ m/s and the frequency of the sound $f = 3000$ Hz (so that the acoustic wavelength is approximately half a meter). The total source level would then be 206+28=234 dB. This very high source level is omni-directional in the horizontal direction, but concentrated in a narrow vertical beam. There is no other known way to generate this much source level with so little ship impact.

The source level will decrease along the cable 10 for two reasons: (1) loss of acoustic energy into the surrounding water; and (2) pressure drop due to friction. This provides a practical limit to the length of such a cable.

The pressure drop due to friction can be estimated by the equation (2):

$$\Delta p = f \frac{L}{D} \frac{\rho}{2} w^2 \quad (2)$$

$$f = \frac{64}{Re} \quad (3)$$

$$Re = \frac{wD}{v} \quad (4)$$

where $$f = \frac{64}{Re} \quad (3)$$

$$Re = \frac{wD}{v} \quad (4)$$

L is the hydraulic hose length (1 mile);
D is the hydraulic hose inner diameter (¼");
ρ is the hydraulic fluid density ($\approx 1000$ kg/m$^3$);
w is the acoustic particle velocity;
v is the hydraulic fluid kinematic viscosity ($10^{-6}$ m$^2$/s); and
Re is the Reynolds number.

The acoustic particle velocity of an equivalent plane wave for a 206 dB source is 0.01 m/s. Converting this to an effective rms velocity leads to a loss of approximately 0.06 atmospheres (or 60% of the incident acoustic pressure) over a mile long tube. In other words, the end of the cable will have a much lower source level. However, the losses over a 150 meter cable will be only about 6%, not enough to prevent a standing wave to radiate at broadside.

Conventional active sonar systems have pings of approximately 0.1 second separated by 2 to 5 seconds (depending on range). Sending pulses like this would generate end-fire-like transmissions, because the pressure pulse would radiate along the cable 10 as it propagates along its length (with a % atmosphere amplitude). However, the pulse length would be approximately 150 meters, so it would be some combination of broadside and end-fire.

The CW transmission required to achieve a broadside beam would be appropriate for the continuous transmit sonar systems as disclosed in U.S. Pat. Nos. 5,150,335 and 7,106,656. Such systems require the transmission of acoustic energy whose frequency varies linearly in time in a saw tooth pattern having a 100% duty cycle.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An acoustic line source system comprising:
   a transmitter capable of generating and transmitting an acoustic signal having acoustic pressure pulses;
   a cable extending from the transmitter into the water having a plurality of concentric layers wherein the cable consists of an exterior layer of steel armored wires, a water blocking layer beneath the layer of steel armored wired, and a layer of a plurality of insulated electrical conductors beneath the water blocking layer; and
   a hose contained within the cable beneath the layer of a plurality of insulated electrical conductors, wherein the hose is filled with hydraulic fluid that receives a plurality of acoustic pressure pulses from the transmitter.

2. The system of claim 1, further comprising a winch assembly including a hollow winch drum joined to said cable for deploying and retrieving the cable into and out of a body of water.

3. The system of claim 2, wherein the transmitter further comprises:
   a flattened hydraulic chamber section of the hose secured within the winch drum; and
   a plurality of acoustic transducers mounted on either side of the flattened chamber section, wherein the plurality of acoustic transducers function as pistons that generate acoustic pressure into the hydraulic fluid along a length of the cable.

4. The system of claim 3, wherein the flattened hydraulic chamber section of the hose comprises an inner cross sectional area approximately equal to an area of the hose cross section.

5. The system of claim 3, wherein the winch drum further comprises a hole for inserting and securing the flattened hydraulic chamber section of the hose.

6. The system of claim 3, wherein the transmitter and winch assembly are located on an unmanned vehicle on a body of water.

7. The system of claim 1, wherein the acoustic signal generated by the transmitter is a continuous wave sound transmission.

8. The system of claim 1, wherein the acoustic signal generated by the transmitter is a pulsed sound transmission.

9. The system of claim 3, wherein the plurality of acoustic transducers are a plurality of Tonpilz transducers that generate acoustic pressure in the hydraulic fluid in the flattened chamber, and are located inside of the hollow winch drum.

\* \* \* \* \*